US012608979B2

(12) United States Patent
Higuchi et al.

(10) Patent No.: US 12,608,979 B2
(45) Date of Patent: Apr. 21, 2026

(54) GESTURE RECOGNITION APPARATUS AND METHOD FOR RECOGNIZING GESTURE

(71) Applicant: Mitsubishi Electric Corporation, Tokyo (JP)

(72) Inventors: Daiki Higuchi, Tokyo (JP); Daisuke Ohashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 394 days.

(21) Appl. No.: 18/035,858

(22) PCT Filed: Jan. 8, 2021

(86) PCT No.: PCT/JP2021/000437
§ 371 (c)(1),
(2) Date: May 8, 2023

(87) PCT Pub. No.: WO2022/149251
PCT Pub. Date: Jul. 14, 2022

(65) Prior Publication Data
US 2024/0013575 A1      Jan. 11, 2024

(51) Int. Cl.
*G06V 40/20*       (2022.01)
*G06V 10/98*       (2022.01)
*G06V 20/59*       (2022.01)

(52) U.S. Cl.
CPC .............. *G06V 40/28* (2022.01); *G06V 10/98* (2022.01); *G06V 20/59* (2022.01)

(58) Field of Classification Search
CPC ........ G06V 40/28; G06V 40/20; G06V 20/59; G06V 10/98; G06V 20/50; G06V 30/147;
(Continued)

(56) References Cited

U.S. PATENT DOCUMENTS

2007/0262574 A1* 11/2007 Breed ............... B60R 21/01526
                                                                                  382/104
2012/0062736 A1*  3/2012 Xiong ................... G06F 3/0425
                                                                                  382/199
(Continued)

FOREIGN PATENT DOCUMENTS

JP           2019-505011 A      2/2019
WO        WO 2015/037273 A1    3/2015
WO        WO 2017/100334 A1    6/2017

OTHER PUBLICATIONS

International Search Report for PCT/JP2021/000437 mailed on Feb. 22, 2021.

*Primary Examiner* — Oneal R Mistry
*Assistant Examiner* — Duy Tran
(74) *Attorney, Agent, or Firm* — Birch, Stewart, Kolasch & Birch, LLP

(57)                          ABSTRACT

Provided is a gesture recognition apparatus that accurately identifies a hand that is an identification object. The gesture recognition apparatus includes a hand candidate identifying unit, a vehicle outside scenery identifying unit, and a false recognition identifying unit. The hand candidate identifying unit identifies, based on a picture in a cabin of a vehicle, at least one hand candidate that is a candidate for a hand of an occupant of the vehicle in the picture. The vehicle outside scenery identifying unit determines whether the at least one hand candidate is a light source image ascribable to a light source outside the vehicle, based on a predefined condition on a shape of the hand candidate. The false recognition identifying unit identifies a hand candidate determined not to be the light source image, as the hand of the occupant with a gesture.

7 Claims, 16 Drawing Sheets

(58) Field of Classification Search
CPC .. G06V 30/1473; G06V 40/11; G06V 40/107;
G06V 40/10; G06T 7/00; G06T 7/579;
G06T 7/586; G06T 7/20; G06T 15/50;
G06T 2207/30268; G06T 2207/30248;
G08G 1/16
See application file for complete search history.

(56) References Cited

U.S. PATENT DOCUMENTS

| | | | |
|---|---|---|---|
| 2015/0003682 A1* | 1/2015 | Kondou | G06V 40/113 |
| | | | 382/103 |
| 2016/0209927 A1* | 7/2016 | Yamagishi | G06F 3/0304 |
| 2017/0160813 A1 | 6/2017 | Divakaran et al. | |
| 2017/0267169 A1* | 9/2017 | Fleurence | G01S 13/88 |
| 2017/0270924 A1* | 9/2017 | Fleurence | B60K 35/10 |
| 2019/0213406 A1* | 7/2019 | Porikli | G06V 20/597 |

* cited by examiner

F I G.　1
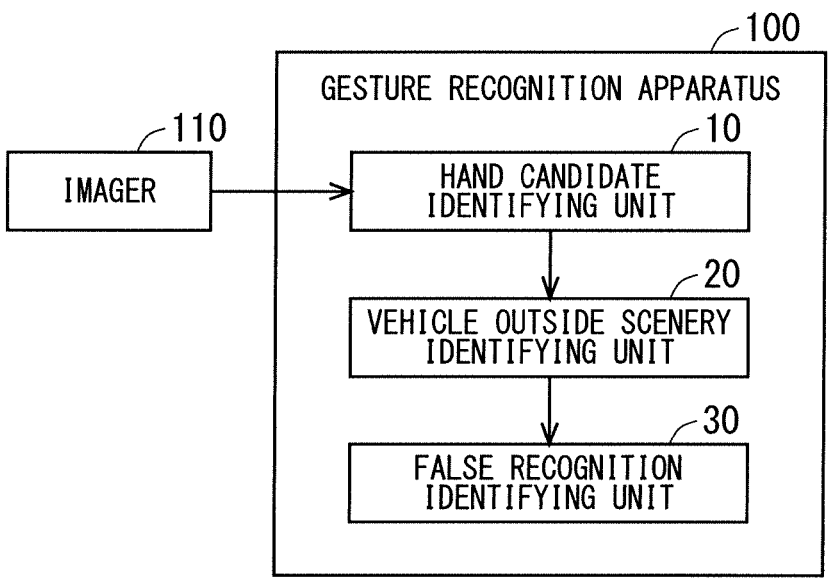

F I G.  2
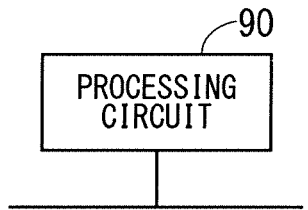

F I G   3
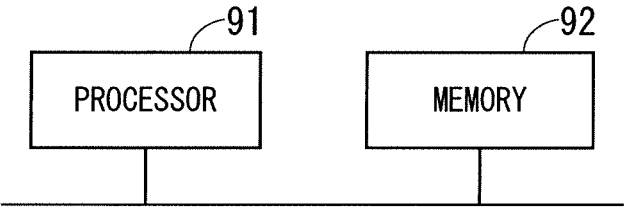

F I G   4
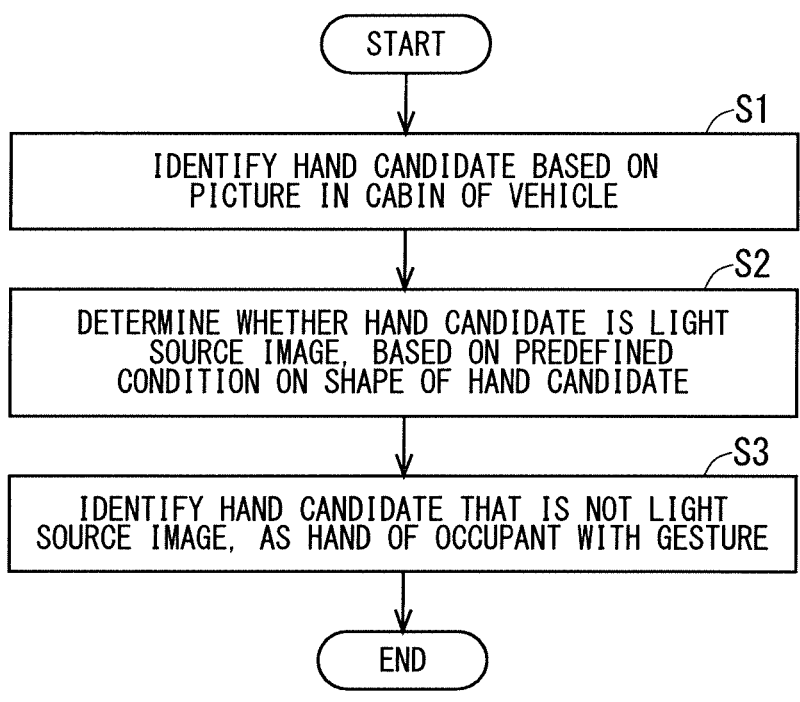

F I G  5
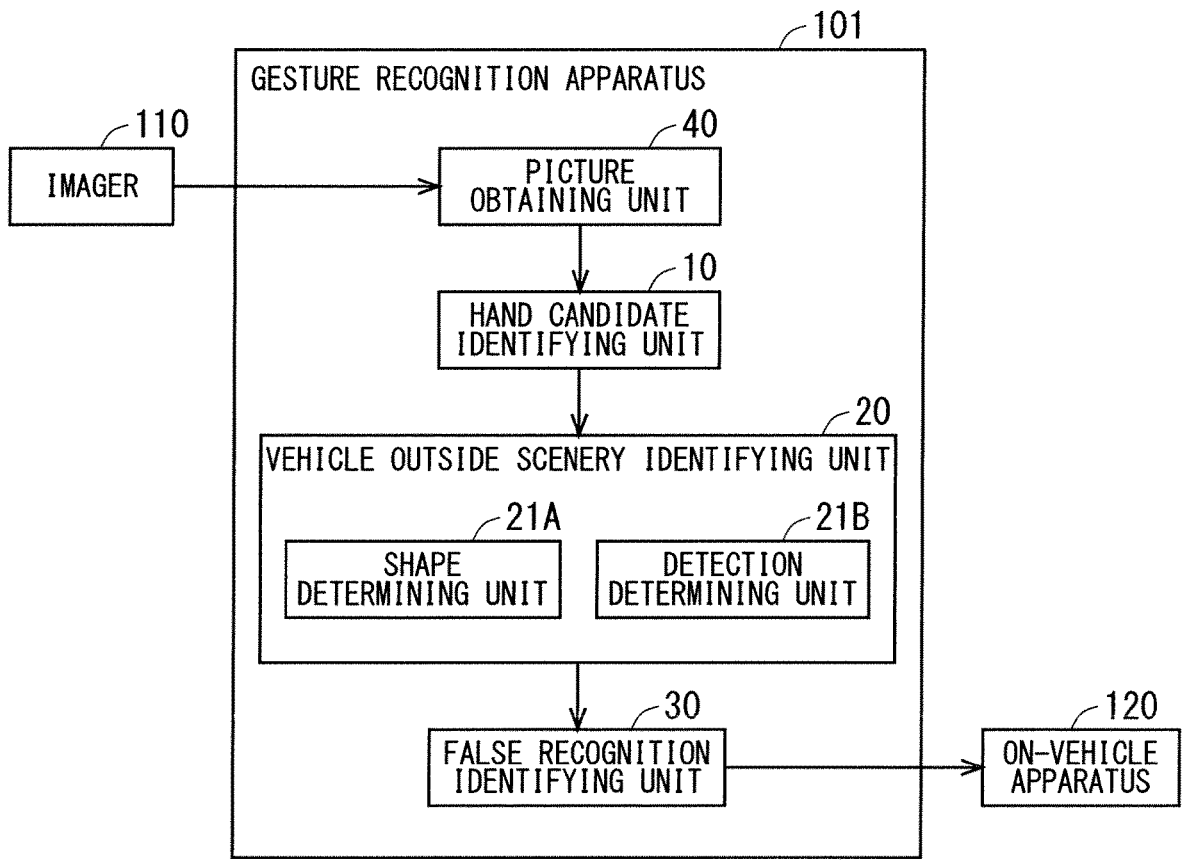

F I G.  6
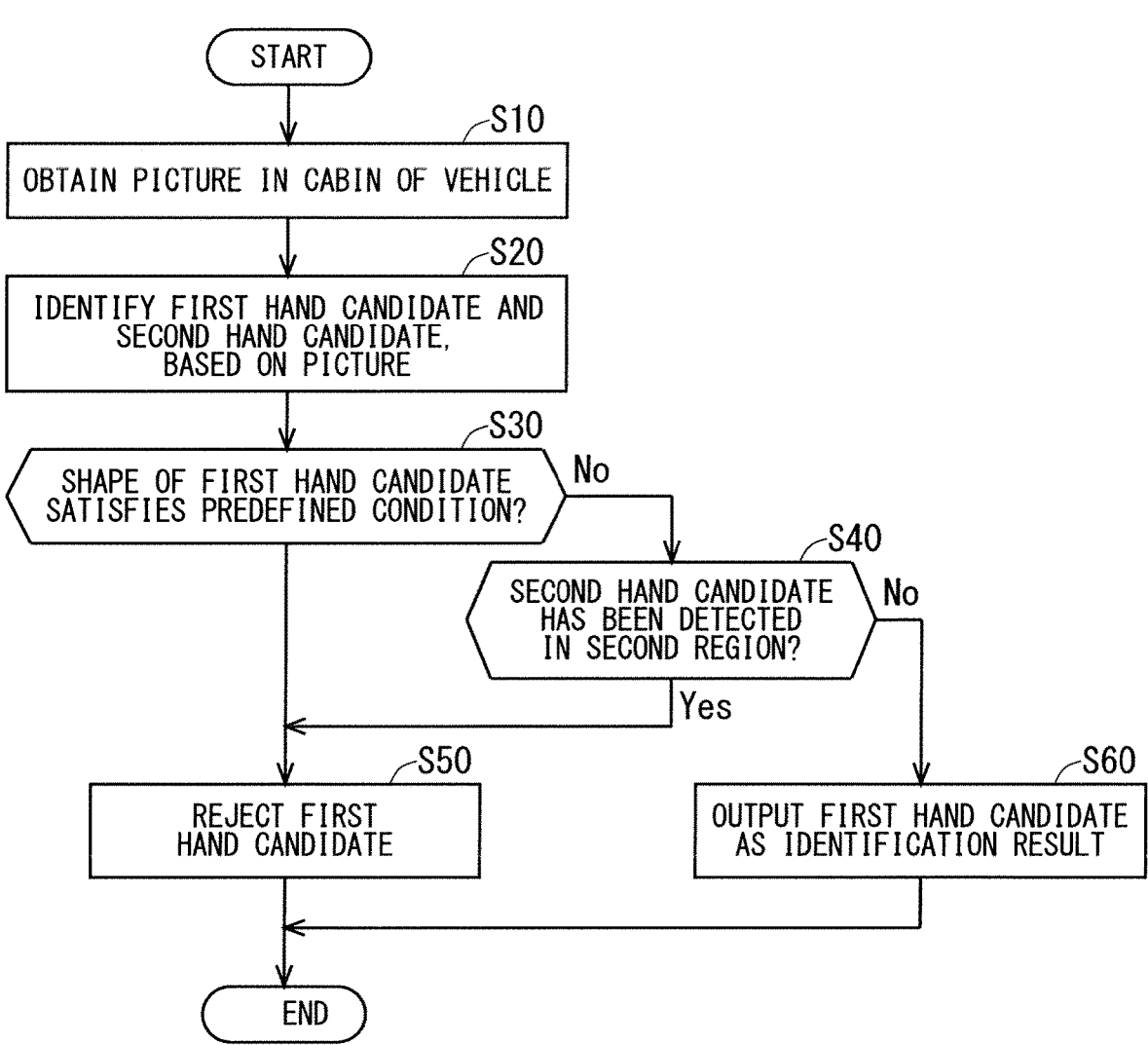

F I G. 7
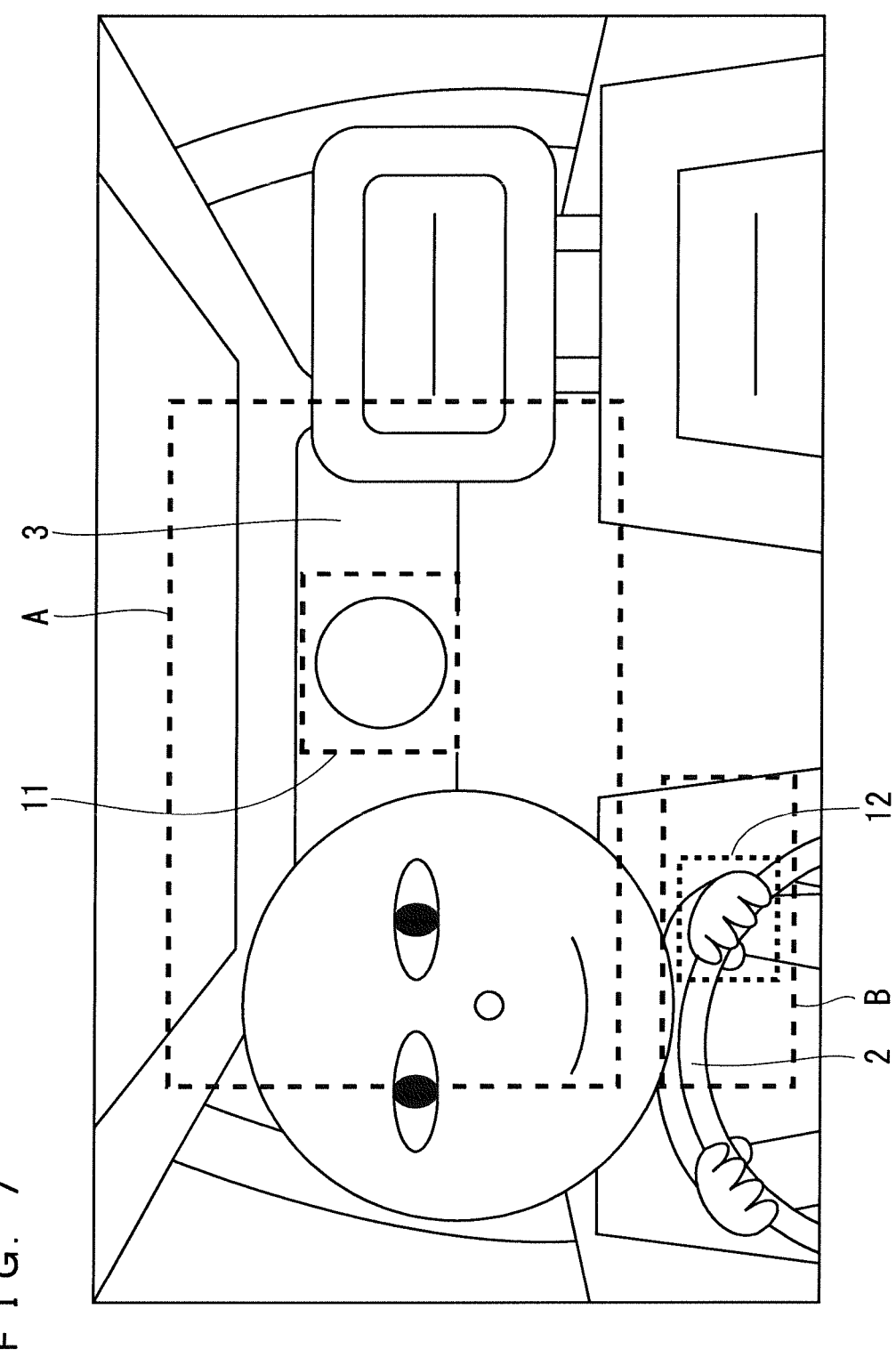

F I G 8
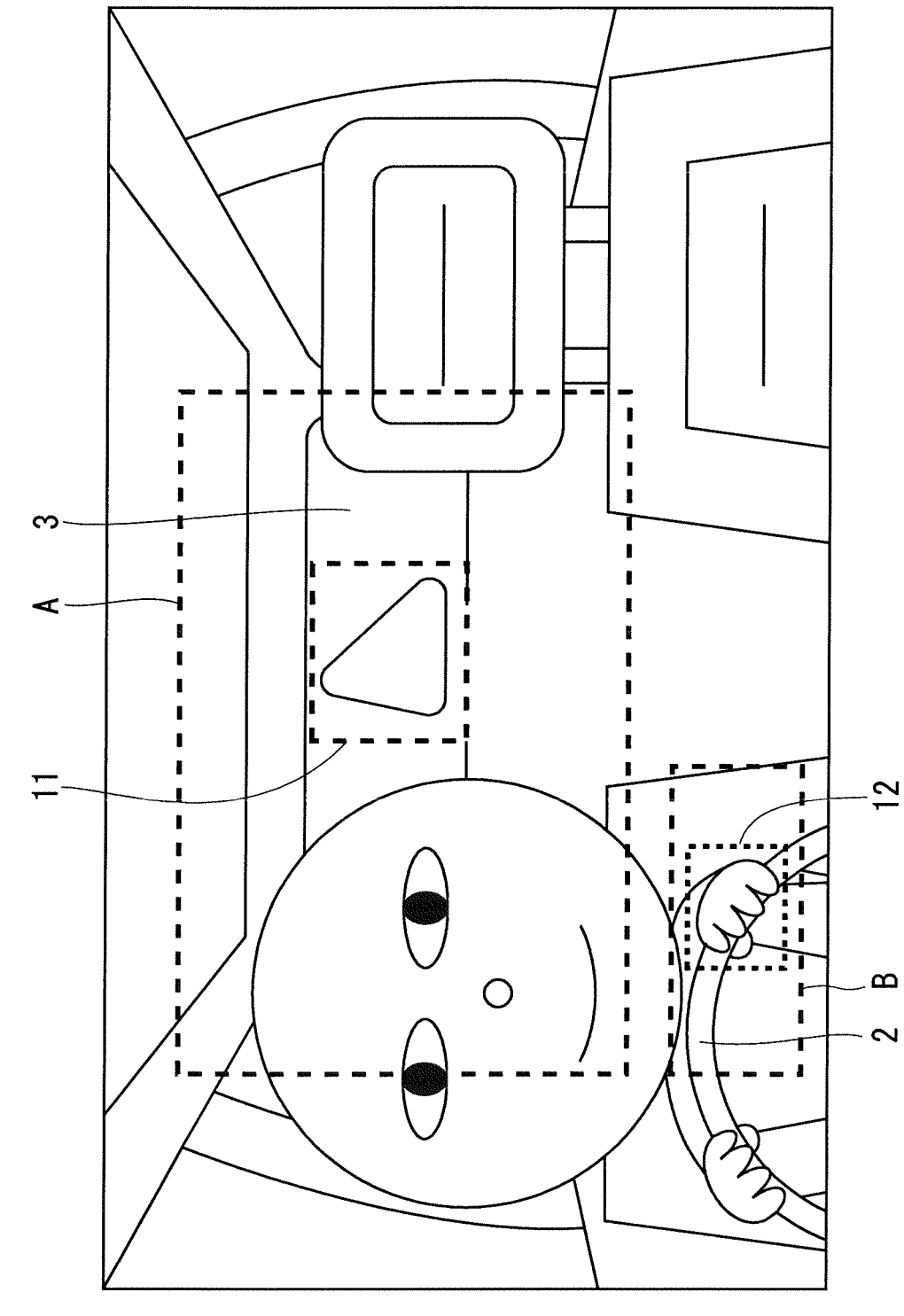

F I G .  1 0
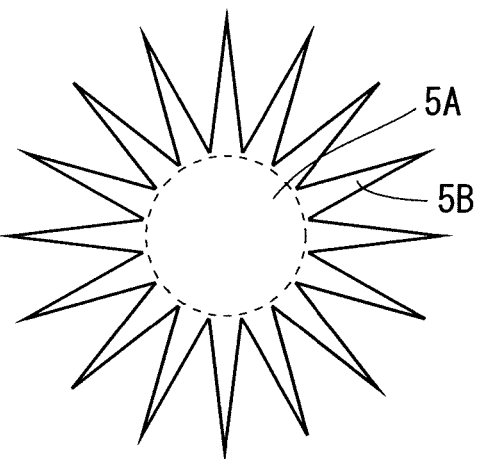

F I G.   1 1
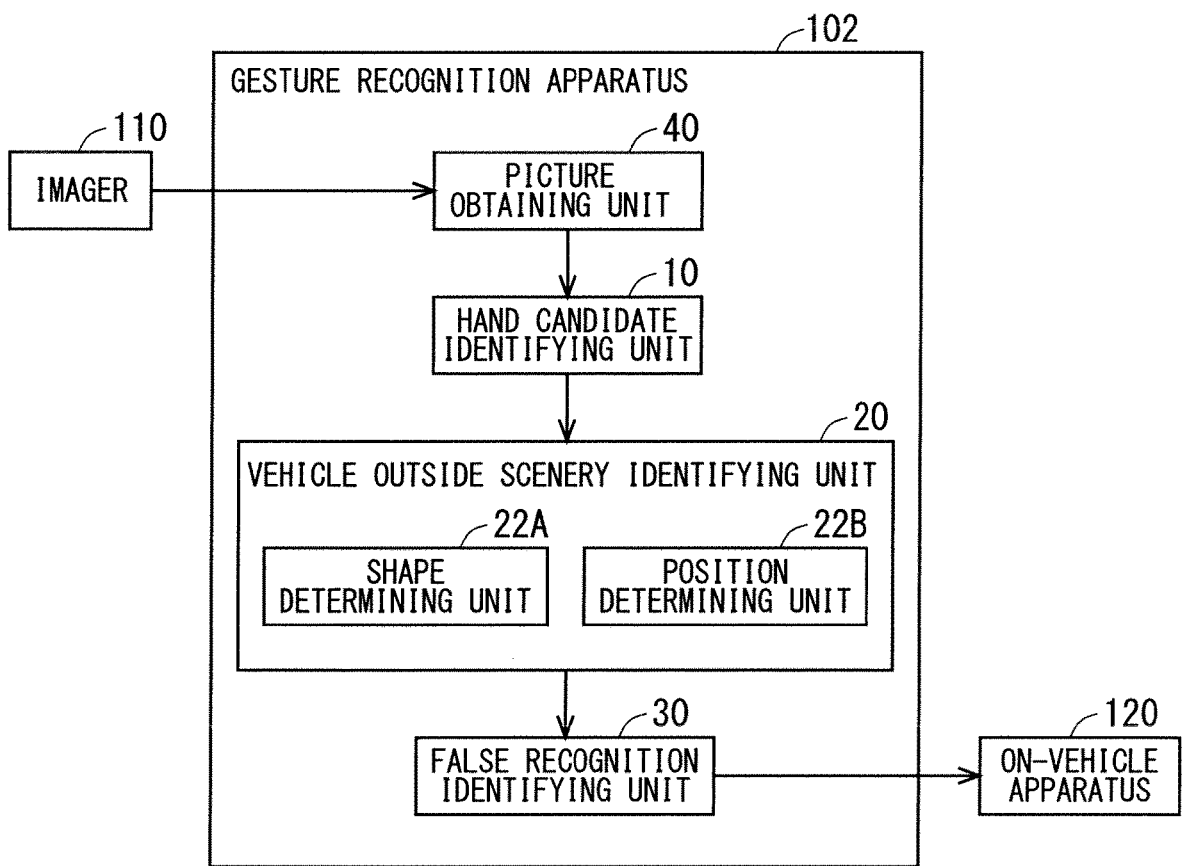

F I G.　1 2
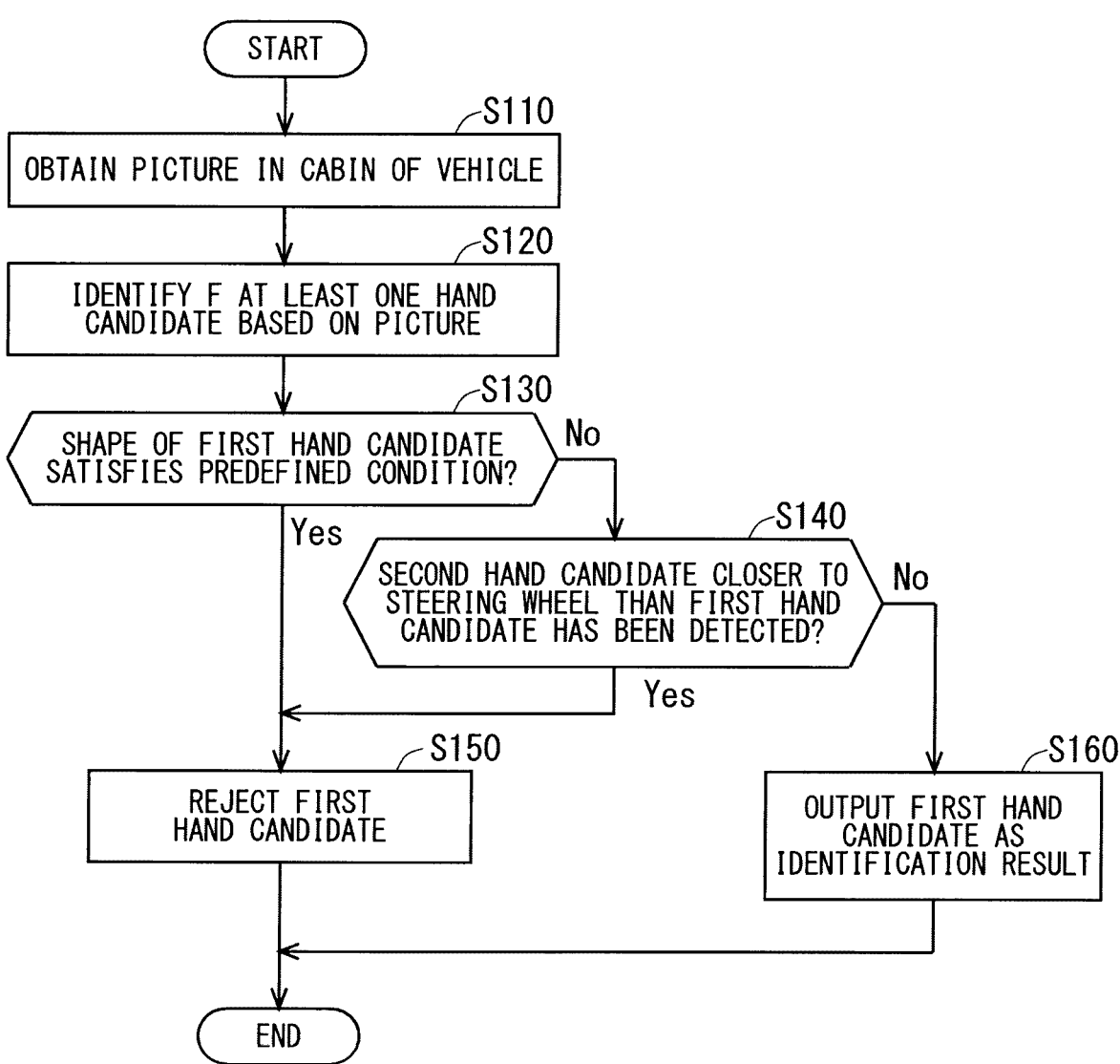

F I G .  1 4
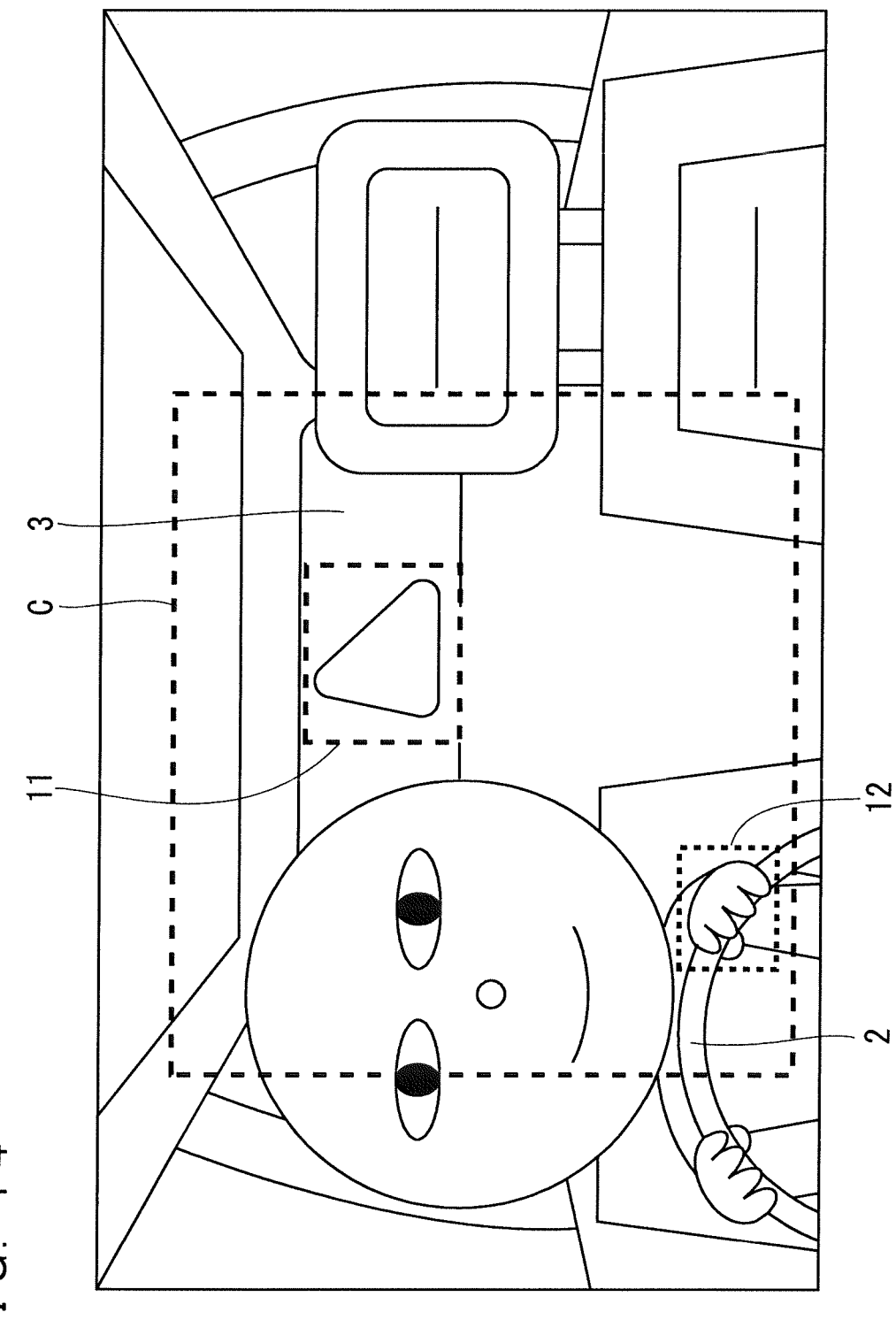

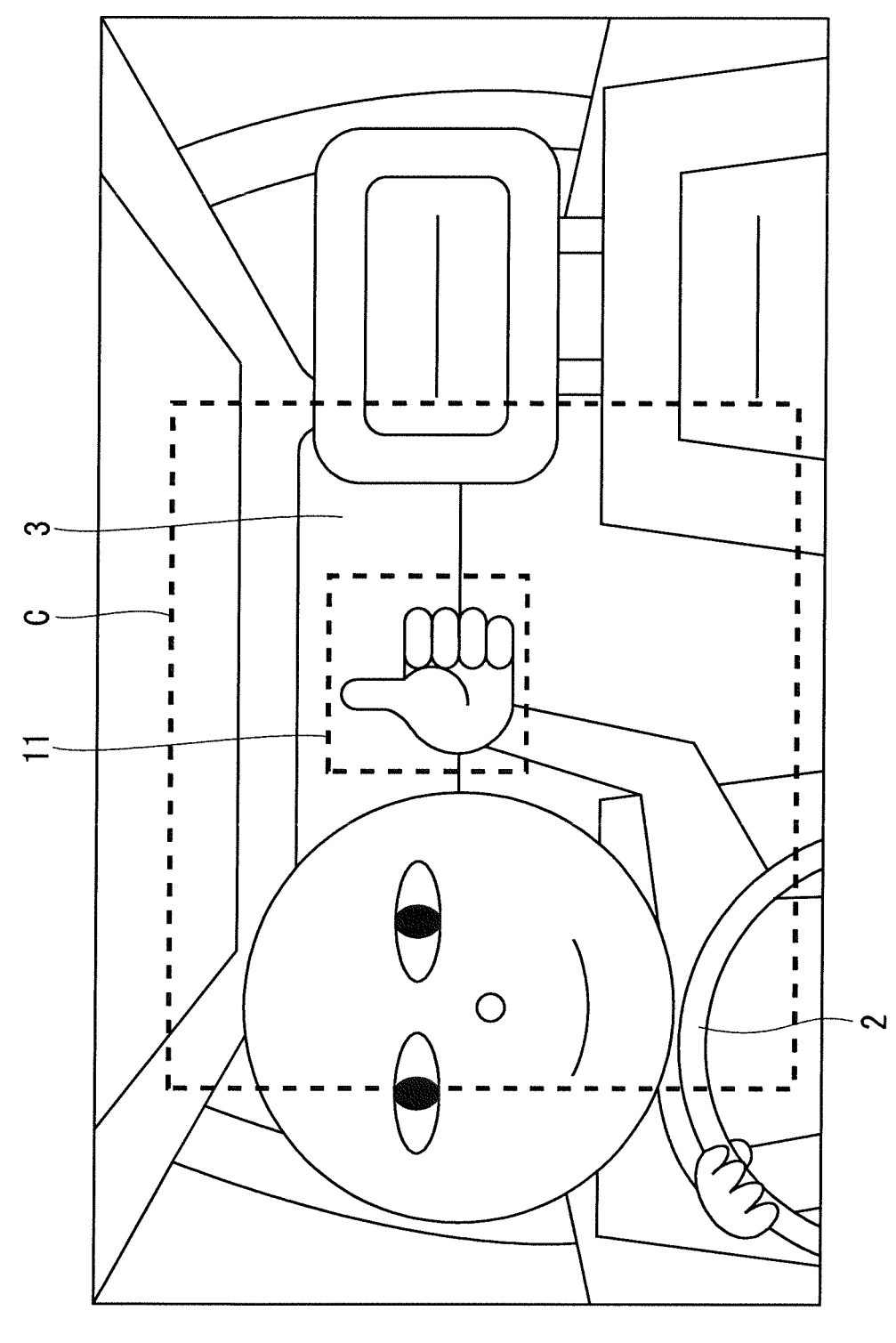
F I G. 1 5

F I G. 1 6
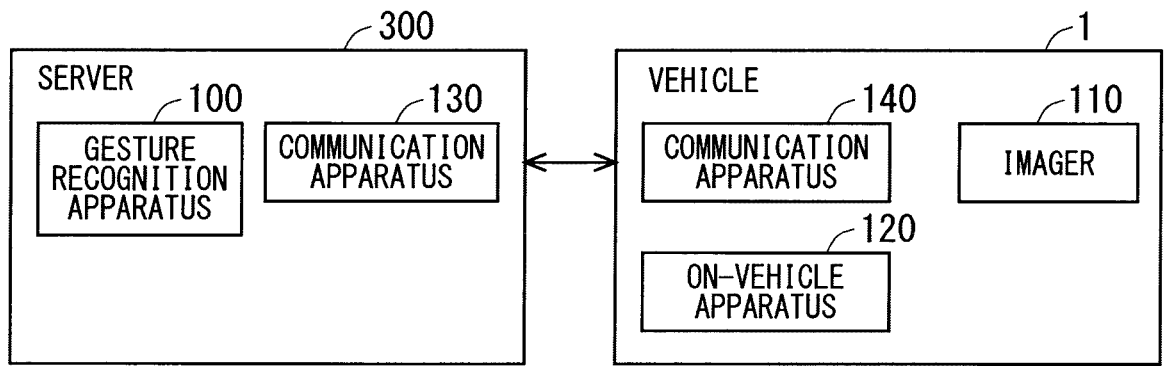

GESTURE RECOGNITION APPARATUS AND METHOD FOR RECOGNIZING GESTURE

TECHNICAL FIELD

The present disclosure relates to a gesture recognition apparatus and a method for recognizing a gesture.

BACKGROUND ART

A technology for identifying, for example, a face, a gesture, or a body language from information in an image is known (e.g., Patent Document 1). Such an identification technology is applicable to a human-machine interface (HMI) to be operated by an occupant in a vehicle. For example, a gesture recognition apparatus identifies a gesture of the hand of an occupant, based on a picture in a vehicle.

PRIOR ART DOCUMENT

Patent Document

Patent Document 1: Japanese Unexamined Patent Application Publication (Translation of PCT Application) No. 2019-505011

Problem to be Solved by the Invention

Pictures sometimes include a light source outside a vehicle as a scenery outside the vehicle. When the light source image is similar to an image of a hand of an occupant to be identified, there is a possibility that the gesture recognition apparatus determines the light source image to be the image of the hand of the occupant. When the gesture recognition apparatus falsely makes the determination, it does not accurately identify the hand of the occupant.

The present disclosure provides a gesture recognition apparatus that accurately identifies a hand that is an identification object to solve the problem.

Means to Solve the Problem

The gesture recognition apparatus according to the present disclosure includes a hand candidate identifying unit, a vehicle outside scenery identifying unit, and a false recognition identifying unit. The hand candidate identifying unit identifies, based on a picture in a cabin of a vehicle, at least one hand candidate that is a candidate for a hand of an occupant of the vehicle in the picture. The vehicle outside scenery identifying unit determines whether the at least one hand candidate is a light source image ascribable to a light source outside the vehicle, based on a predefined condition on a shape of the hand candidate. The false recognition identifying unit identifies a hand candidate determined not to be the light source image, as the hand of the occupant with a gesture.

Effects of the Invention

The present disclosure provides a gesture recognition apparatus that accurately identifies a hand that is an identification object.

The object, features, aspects, and advantages of the present disclosure will become more apparent from the following detailed description and the accompanying drawings.

BRIEF DESCRIPTION OF DRAWINGS

FIG. 1 is a functional block diagram illustrating a configuration of a gesture recognition apparatus according to Embodiment 1.

FIG. 2 illustrates an example configuration of a processing circuit included in the gesture recognition apparatus.

FIG. 3 illustrates another example configuration of a processing circuit included in the gesture recognition apparatus.

FIG. 4 is a flowchart illustrating a method for recognizing a gesture according to Embodiment 1.

FIG. 5 is a functional block diagram illustrating a configuration of a gesture recognition apparatus according to Embodiment 2.

FIG. 6 is a flowchart illustrating a method for recognizing a gesture according to Embodiment 2.

FIG. 7 illustrates an example picture in a vehicle.

FIG. 8 illustrates an example picture in a vehicle.

FIG. 10 illustrates an example light source image.

FIG. 11 is a functional block diagram illustrating a configuration of a gesture recognition apparatus according to Embodiment 3.

FIG. 12 is a flowchart illustrating a method for recognizing a gesture according to Embodiment 3.

FIG. 14 illustrates an example picture in a vehicle.

FIG. 15 illustrates an example picture in a vehicle.

FIG. 16 is a functional block diagram illustrating a configuration of a gesture recognition apparatus according to Embodiment 6 and apparatuses that operate in association with the gesture recognition apparatus.

DESCRIPTION OF EMBODIMENTS

Embodiment 1

Figure 9:
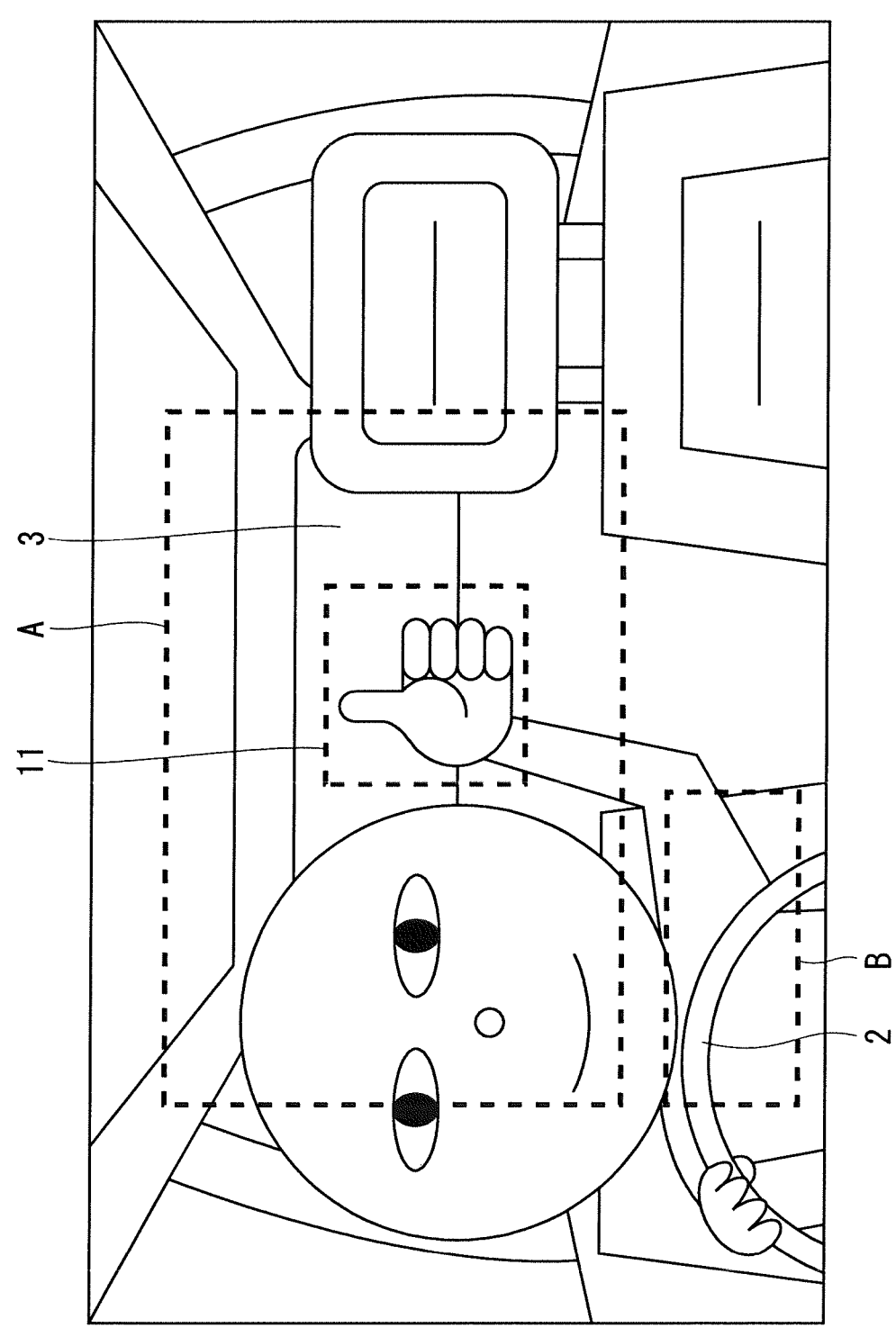
FIG. 9 illustrates an example picture in a vehicle.

FIG. 1 is a functional block diagram illustrating a configuration of a gesture recognition apparatus 100 according to Embodiment 1. FIG. 1 illustrates an imager 110 as an apparatus that operates in association with the gesture recognition apparatus 100.

The imager 110 is installed in a vehicle. The imager 110 takes a picture of an occupant in a cabin of a vehicle.

The gesture recognition apparatus 100 identifies the hand of an occupant, based on the picture in a vehicle. The gesture recognition apparatus 100 detects a gesture indicated by the identified hand of the occupant. Hereinafter, a "gesture" means not limited to but a predefined "shape of the hand" for operating, for example, a device mounted in the vehicle. A "gesture" may be a predefined "movement of the hand".

The gesture recognition apparatus 100 includes a hand candidate identifying unit 10, a vehicle outside scenery identifying unit 20, and a false recognition identifying unit 30.

The hand candidate identifying unit 10 identifies, based on a picture in the cabin of the vehicle, at least one hand candidate that is a candidate for the hand of the occupant of the vehicle in the picture.

The vehicle outside scenery identifying unit 20 determines whether the at least one hand candidate is a light source image, based on a predefined condition on a shape of a hand candidate. The light source image is ascribable to a light source outside the vehicle. Examples of the light source include the sun, a street light, and a headlight of a following vehicle. A light source image is, for example, a transmission image obtained by allowing light emitted from a light source to pass through a window of a vehicle. Alternatively, a light source image may be a reflected image obtained by reflecting light emitted from a light source off an object (e.g., a window, a mirror, costume jewelry of an occupant) in a cabin of a vehicle. The predefined condition on the shape of the hand candidate is stored in, for example, the gesture recognition apparatus 100.

The false recognition identifying unit 30 identifies a hand candidate determined not to be a light source image, as a hand of an occupant with a gesture. The false recognition identifying unit 30 outputs a result of the identified hand.

FIG. 2 illustrates an example configuration of a processing circuit 90 included in the gesture recognition apparatus 100. The processing circuit 90 implements functions of the hand candidate identifying unit 10, the vehicle outside scenery identifying unit 20, and the false recognition identifying unit 30. In other words, the processing circuit 90 includes the hand candidate identifying unit 10, the vehicle outside scenery identifying unit and the false recognition identifying unit 30.

When the processing circuit 90 is dedicated hardware, the processing circuit 90 is, for example, a single circuit, a composite circuit, a programmed processor, a parallel-programmed processor, an application-specific integrated circuit (ASIC), a field-programmable gate array (FPGA), or a circuit obtained by combining some of these. A plurality of processing circuits may separately implement the functions of the hand candidate identifying unit 10, the vehicle outside scenery identifying unit 20, and the false recognition identifying unit 30, or one processing circuit may collectively implement the functions.

FIG. 3 illustrates another example configuration of a processing circuit included in the gesture recognition apparatus 100. The processing circuit includes a processor 91 and a memory 92. The processor 91 executes a program stored in the memory 92 to implement the functions of the hand candidate identifying unit 10, the vehicle outside scenery identifying unit 20, and the false recognition identifying unit 30. The processor 91 executes, for example, software written as a program to implement the functions. As such, the gesture recognition apparatus 100 includes the memory 92 for storing a program, and the processor 91 executing the program.

A function for the gesture recognition apparatus 100 to identify, based on a picture in a cabin of a vehicle, at least one hand candidate that is a candidate for the hand of an occupant of the vehicle in the picture is written in the program. A function for the gesture recognition apparatus 100 to determine whether the at least one hand candidate is a light source image, based on a predefined condition on a shape of a hand candidate is also written in the program. The light source image is ascribable to a light source outside the vehicle. A function for identifying a hand candidate determined not to be a light source image, as a hand of an occupant with a gesture is also written in the program. The program causes a computer to execute procedures or methods of the hand candidate identifying unit 10, the vehicle outside scenery identifying unit 20, and the false recognition identifying unit 30. The processor 91 is, for example, a central processing unit (CPU). Examples of the memory 92 include non-volatile or volatile semiconductor memories such as a random-access memory (RAM), a read-only memory (ROM), a flash memory, an erasable programmable read-only memory (EPROM), and an electrically erasable programmable read-only memory (EEPROM). Alternatively, the memory 92 may be a storage medium such as a Hard Disk Drive (HDD).

A part of the functions of the hand candidate identifying unit 10, the vehicle outside scenery identifying unit 20, and the false recognition identifying unit 30 may be implemented by dedicated hardware, and another part thereof may be implemented by software. A processing circuit implements the functions by a combination of hardware and software.

FIG. 4 is a flowchart illustrating a method for recognizing a gesture according to Embodiment 1.

In Step S1, the hand candidate identifying unit 10 identifies at least one hand candidate based on a picture in a cabin of a vehicle.

In Step S2, the vehicle outside scenery identifying unit 20 determines whether the at least one hand candidate is a light source image, based on a predefined condition on a shape of a hand candidate.

In Step S3, the false recognition identifying unit 30 identifies a hand candidate determined not to be a light source image, as a hand of an occupant with a gesture. The false recognition identifying unit 30 outputs a result of the identified hand.

In summary, the gesture recognition apparatus 100 according to Embodiment 1 includes the hand candidate identifying unit 10, the vehicle outside scenery identifying unit and the false recognition identifying unit 30. The hand candidate identifying unit 10 identifies, based on a picture in a cabin of a vehicle, at least one hand candidate that is a candidate for a hand of an occupant of the vehicle in the picture. The vehicle outside scenery identifying unit 20 determines whether the at least one hand candidate is a light source image, based on a predefined condition on a shape of a hand candidate. The light source image is ascribable to a light source outside the vehicle. The false recognition identifying unit 30 identifies a hand candidate determined not to be a light source image, as a hand of an occupant with a gesture.

The gesture recognition apparatus 100 described above accurately identifies a hand that is an identification object.

Embodiment 2

A gesture recognition apparatus and a method for recognizing a gesture according to Embodiment 2 will be described. Embodiment 2 will describe a more limitative concept than that of Embodiment 1. In Embodiment 2, the same reference numerals will be assigned to the constituent elements identical to those in Embodiment 1, and the detailed description thereof will be omitted.

FIG. 5 is a functional block diagram illustrating a configuration of a gesture recognition apparatus 101 according to Embodiment 2. FIG. 5 illustrates the imager 110 and an on-vehicle apparatus 120 as apparatuses that operate in association with the gesture recognition apparatus 101.

The imager 110 is, for example, a camera that detects infrared radiation or visible light. The imager 110 is installed in a front central portion in a cabin of a vehicle. The imager 110 takes a picture from the front to the rear of a cabin of a vehicle at wide angles, and takes a picture of both of the driver's seat and the front passenger seat at a time. The pictures taken by the imager 110 sometimes include a light source image outside the vehicle. For example, allowing light emitted from a light source to pass through a rear window of a vehicle causes a transmission image of the light source to appear in a picture.

The gesture recognition apparatus 101 includes a picture obtaining unit 40, the hand candidate identifying unit 10, the vehicle outside scenery identifying unit 20, and the false recognition identifying unit 30.

The picture obtaining unit 40 obtains data of a picture in a cabin of a vehicle which has been taken by the imager 110.

The hand candidate identifying unit 10 identifies a hand candidate that is a candidate for the hand of the occupant of the vehicle, based on the picture. The hand candidate identifying unit 10 according to Embodiment 2 identifies a first hand candidate in a predefined first region in a picture, and a second hand candidate in a predefined second region in the picture. The first region includes, for example, a region between the driver's seat and the front passenger seat of the vehicle in the picture. The first region corresponds to, for example, a region preset as a region in which an occupant makes a hand gesture to operate the on-vehicle apparatus 120. The second region includes at least a part of a region including an image of a steering wheel of the vehicle, and a region within a predefined distance from the steering wheel. The predefined distance is, for example, a distance shorter than a distance from the steering wheel to a point between the driver's seat and the front passenger seat of the vehicle. The second region is a region closer to the steering wheel than the first region.

The hand candidate identifying unit 10, for example, matches a pattern of each region (e.g., information on luminance distribution) with a predefined hand pattern to detect or identify a hand candidate. The hand to be identified may be any one hand of an opened hand and a closed hand. The hand to be identified is, for example, a closed hand or an opened hand in playing rock-paper-scissors. The hand to be identified may be a hand showing, for example, a number, a direction, or an intention of an occupant (e.g., OK or GOOD). The hand to be identified may be defined, for example, for each of on-vehicle apparatuses 120 to be operated or for each of operation types. The hand to be identified in the first region according to Embodiment 2 is a hand with a thumb up. In other words, the hand candidate identifying unit 10 detects, as a hand candidate, a pattern similar to a hand with a thumb up in the first region. The hand to be identified in the second region is any, for example, a hand holding the steering wheel.

The vehicle outside scenery identifying unit 20 includes a shape determining unit 21A and a detection determining unit 21B. The shape determining unit 21A determines whether the first hand candidate is a light source image, based on a predefined condition on a shape of a hand candidate. Here, the shape determining unit 21A may detect a shape of the first hand candidate based on a picture of the first hand candidate by itself, or obtain information on the shape of the first hand candidate from the hand candidate identifying unit 10. The detection determining unit 21B determines whether the second hand candidate has been detected in the second region.

When the light source is the sun, a street light, or a headlight of a following vehicle, the light source image highly probably has one round pattern. Thus, the predefined condition on the shape of the hand candidate is whether the shape of the first hand candidate has one round pattern. The round pattern includes, for example, at least one of a circle or an ellipse.

When a picture includes a light source image, a radial pattern referred to as lays of light sometimes appears from the center of the light source image to a radial direction. Thus, the predefined condition on the shape of the hand candidate may be whether the shape of the first hand candidate has one round pattern and a radial pattern around the one round pattern.

The false recognition identifying unit 30 rejects a hand candidate determined to be a light source image, based on a result of the determination made by the shape determining unit 21A and a result of the determination made by the detection determining unit 21B. Then, the false recognition identifying unit 30 identifies the first hand candidate determined not to be a light source image, as a hand of an occupant.

The gesture recognition apparatus 101 detects a gesture indicated by the hand of the occupant based on the result of the identification. The gesture recognition apparatus 101 outputs a control signal based on the gesture, to the on-vehicle apparatus 120. The on-vehicle apparatus 120 is controlled based on the control signal. Examples of the on-vehicle apparatus 120 include an air conditioner and a car audio system. A temperature of the air conditioner or a volume of the car audio system is adjusted according to the control signal output from the gesture recognition apparatus 101. The on-vehicle apparatus 120 is not limited to the air conditioner and the car audio system.

The processing circuit illustrated in FIG. 2 or FIG. 3 implements the functions of the hand candidate identifying unit 10, the vehicle outside scenery identifying unit 20, and the false recognition identifying unit 30.

FIG. 6 is a flowchart illustrating the method for recognizing a gesture according to Embodiment 2.

In Step S10, the picture obtaining unit 40 obtains a picture in the cabin of the vehicle which has been taken by the imager 110. FIGS. 7 to 9 illustrate example pictures in a vehicle. Although FIGS. 7 to 9 illustrate the examples in a right-hand drive vehicle, the vehicle may be a left-hand drive vehicle. The picture in FIG. 7 includes a round light source image in a region corresponding to a rear window 3 of the vehicle. The picture in FIG. 8 includes, in the region corresponding to the rear window 3, an object image of, for example, tree shade or a traffic sign except a light source image. The object image is shaped like approximately a triangle. The picture in FIG. 9 includes the hand of an occupant with a gesture. The shape of the light source image in FIG. 7 is not limited to a round. FIG. 10 illustrates an example light source image. The light source image in FIG. includes one round pattern 5A and a radial pattern 5B around the round pattern 5A.

In Step S20, the hand candidate identifying unit 10 identifies a first hand candidate 11 in a first region A and a second hand candidate 12 in a second region B, based on the picture. Here, the first region A includes a region between the driver's seat and the front passenger seat. The second region B includes at least a part of a region including an image of a steering wheel 2, and a region within a predefined distance from the steering wheel 2. The hand to be identified in the first region is a hand with a thumb up. The hand candidate identifying unit 10 identifies, as a first hand candidate 11, a pattern similar to a hand with a thumb up. Thus, the hand candidate identifying unit 10 sometimes detects, as the first hand candidate 11, an object image that is not actually an image of a hand with a thumb up. The hand to be identified in the second region is any, i.e., a hand holding the steering wheel 2 herein. The hand candidate identifying unit 10 identifies a light source image with a round pattern as the first hand candidate 11 in the first region A in FIG. 7. The hand candidate identifying unit 10 identifies an image of the hand of the occupant as the second hand candidate 12 in the second region B. The hand candidate identifying unit 10 identifies the object image shaped like approximately a triangle as the first hand candidate 11 in the first region A in FIG. 8. The hand candidate identifying unit 10 identifies an image of the hand of the occupant as the second hand candidate 12 in the second region B. The hand candidate identifying unit 10 identifies an image of the hand of the occupant as the first hand candidate 11 in the first region A in FIG. 9. The hand candidate identifying unit 10 does not identify or detect the second hand candidate 12 in the second region B.

In Step S30, the shape determining unit 21A of the vehicle outside scenery identifying unit 20 determines whether the shape of the first hand candidate 11 satisfies a predefined condition on the shape. Here, the condition is whether the shape of the first hand candidate 11 has one round pattern. Alternatively, the condition is whether the shape of the first hand candidate 11 has the one round pattern 5A and the radial pattern 5B around the round pattern 5A. In FIG. 7, the shape of the first hand candidate 11 satisfies the predefined condition. Thus, Step S50 is executed. Specifically, the shape determining unit 21A determines the first hand candidate 11 to be a light source image. In other words, the shape determining unit 21A determines that the first hand candidate 11 is not a true hand. In FIGS. 8 and 9, the shape of the first hand candidate 11 does not satisfy the predefined condition. Thus, Step S40 is executed. Specifically, the shape determining unit 21A determines that the first hand candidate 11 is not a light source image.

In Step S40, the detection determining unit 21B of the vehicle outside scenery identifying unit 20 determines whether the second hand candidate 12 has been detected in the second region B. In FIG. 8, the detection determining unit 21B has detected the second hand candidate 12 in the second region B. Thus, Step S50 is executed. Specifically, even in the case where the shape determining unit 21A determines that the first hand candidate 11 is not a light source image in Step S30, when detecting the second hand candidate 12 near the steering wheel 2, the detection determining unit 21B determines that the first hand candidate 11 is not a true hand. In FIG. 9, the detection determining unit 21B does not detect the second hand candidate 12 in the second region B. Thus, Step S60 is executed. Specifically, the detection determining unit 21B determines the first hand candidate 11 to be a true hand.

In Step S50, the false recognition identifying unit 30 rejects the first hand candidate 11 that is not a true hand. Here, the false recognition identifying unit 30 rejects not only the first hand candidate 11 that is a light source image in FIG. 7 but also the first hand candidate 11 in FIG. 8.

In Step S60, the false recognition identifying unit 30 outputs the first hand candidate 11 that is a true hand as a result of the identified hand of the occupant. Here, the false recognition identifying unit 30 outputs the first hand candidate 11 in FIG. 9 as a result of the identified hand.

The gesture recognition apparatus 101 described above accurately identifies a hand that is an identification object. The gesture recognition apparatus 101 particularly increases the accuracy of recognition of a gesture of a driver among occupants.

[Modification 1 of Embodiment 2]

The vehicle outside scenery identifying unit 20 may update a condition on a shape of a hand candidate with an arbitrary timing. The condition on the shape of the hand candidate may be a learned model. For example, the vehicle outside scenery identifying unit 20 obtains a new learned model from the outside, and stores the new learned model as a predefined condition on a shape of a hand candidate. In other words, the condition on the shape of the hand candidate should be predefined when the vehicle outside scenery identifying unit 20 performs a process of making the aforementioned determination.

[Modification 2 of Embodiment 2]

When a hand candidate is located in a region corresponding to any one of windows of a vehicle, the hand candidate is highly probably a light source image ascribable to a light source outside the vehicle. Thus, the first region A may be a region corresponding to a window of the vehicle in the picture. The region corresponding to the window of the vehicle, which is, for example, the rear window 3 as described in Embodiment 2, may be a window other than the rear window 3. The hand candidate identifying unit 10 identifies the first hand candidate 11 in the region corresponding to the window of the vehicle.

The vehicle outside scenery identifying unit 20 may determine the first hand candidate 11 to be a light source image not only based on a predefined condition on a shape of the hand candidate, but also when the first hand candidate 11 is higher in luminance than the second hand candidate 12. Alternatively, the vehicle outside scenery identifying unit may determine the first hand candidate 11 to be a light source image when the luminance of the first hand candidate 11 is higher than or equal to a predefined luminance. For example, the vehicle outside scenery identifying unit 20 may determine the first hand candidate 11 to be a light source image when a luminance value of a center of one round pattern of the first hand candidate 11 is saturated. Furthermore, the vehicle outside scenery identifying unit 20 may determine the first hand candidate 11 to be a light source image when the first hand candidate 11 has a luminance-value distribution which monotonously decreases from the center to the periphery.

A pattern referred to as lens flare sometimes appears in a picture including a light source image. The vehicle outside scenery identifying unit 20 may determine whether the first hand candidate 11 is a light source image, based on the presence or absence of at least one pattern of an arc pattern, a ring pattern, or a polygonal pattern around the first hand candidate 11 that satisfies a predefined condition on a shape of a hand candidate.

The gesture recognition apparatus 101 described above further increases the accuracy of determining whether the first hand candidate 11 is a light source image.

Embodiment 3

A gesture recognition apparatus and a method for recognizing a gesture according to Embodiment 3 will be described. Embodiment 3 will describe a more limitative concept than that of Embodiment 1. In Embodiment 3, the same reference numerals will be assigned to the constituent elements identical to those in Embodiment 1 or 2, and the detailed description thereof will be omitted.

FIG. 11 is a functional block diagram illustrating a configuration of a gesture recognition apparatus 102 according to Embodiment 3.

The gesture recognition apparatus 102 includes the picture obtaining unit 40, the hand candidate identifying unit 10, the vehicle outside scenery identifying unit 20, and the false recognition identifying unit 30.

The hand candidate identifying unit 10 identifies the first hand candidate 11 and the second hand candidate 12 as at least one hand candidate. The hand to be identified is any, for example, a hand with a thumb up and a hand holding the steering wheel 2. The hand candidate identifying unit 10 detects, as a hand candidate, a pattern similar to a hand to be identified in the picture.

The vehicle outside scenery identifying unit 20 includes a shape determining unit 22A and a position determining unit 22B. The shape determining unit 22A determines whether the first hand candidate 11 is a light source image, based on a predefined condition on a shape of the hand candidate. The condition on the shape is identical to that according to Embodiment 2. The position determining unit 22B determines whether the second hand candidate 12 closer to the steering wheel 2 of the vehicle than the first hand candidate 11 has been detected. Here, the position determining unit 22B may detect positions of the first hand candidate 11 and the second hand candidate 12 based on a picture by itself, or obtain information on the positions from the hand candidate identifying unit 10. The position information is, for example, coordinate information in a picture.

The false recognition identifying unit 30 rejects the first hand candidate 11 determined to be a light source image, based on a result of the determination made by the shape determining unit 22A and a result of the determination made by the position determining unit 22B. Then, the false recognition identifying unit 30 identifies the first hand candidate 11 determined not to be a light source image, as a hand of an occupant.

The processing circuit illustrated in FIG. 2 or FIG. 3 implements the functions of the picture obtaining unit 40, the hand candidate identifying unit 10, the vehicle outside scenery identifying unit 20, and the false recognition identifying unit 30.

FIG. 12 is a flowchart illustrating the method for recognizing a gesture according to Embodiment 3.

Figure 13:
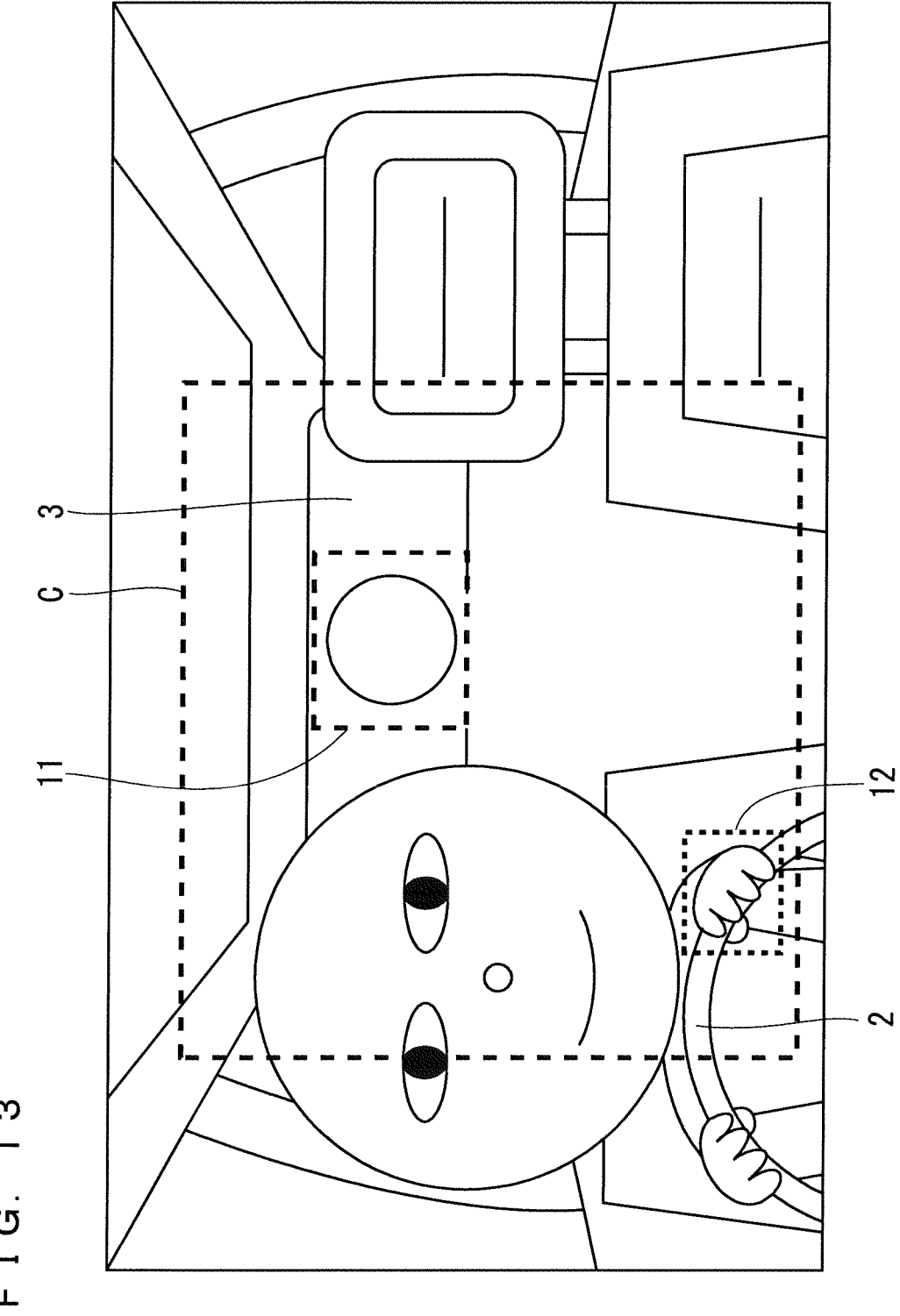
FIG. 13 illustrates an example picture in a vehicle.

In Step S110, the picture obtaining unit 40 obtains a picture in the cabin of the vehicle which has been taken by the imager 110. FIGS. 13 to 15 illustrates example pictures in a vehicle. The picture in FIG. 13 includes a round light source image in a region corresponding to the rear window 3 of the vehicle. The picture in FIG. 14 includes, in the region corresponding to the rear window 3, an object image of, for example, tree shade or a traffic sign except a light source image. The picture in FIG. 15 includes the hand of an occupant with a gesture.

In Step S120, the hand candidate identifying unit 10 identifies at least one hand candidate based on the picture. Here, the hand candidate identifying unit 10 identifies the first hand candidate 11 and the second hand candidate 12 in a predefined region C. The hand candidate identifying unit 10 identifies a light source image with a round pattern as the first hand candidate 11 in FIG. 13. The hand candidate identifying unit 10 identifies an image of the hand holding the steering wheel 2 as the second hand candidate 12. The hand candidate identifying unit 10 identifies an object image shaped like approximately a triangle as the first hand candidate 11 in FIG. 14. The hand candidate identifying unit 10 identifies an image of the hand holding the steering wheel 2 as the second hand candidate 12. The hand candidate identifying unit 10 identifies an image of the hand of the occupant as the first hand candidate 11 in FIG. 15. The hand candidate identifying unit 10 does not identify or detect the second hand candidate 12.

In Step S130, the shape determining unit 22A of the vehicle outside scenery identifying unit 20 determines whether the shape of the first hand candidate 11 satisfies a predefined condition on the shape. The condition is identical to that according to Embodiment 2 herein. In FIG. 13, the shape of the first hand candidate 11 satisfies the predefined condition. Thus, Step S150 is executed. Specifically, the shape determining unit 22A determines that the first hand candidate 11 is a light source image. Since the first hand candidate 11 does not satisfy the predefined condition in FIGS. 14 and 15, Step S140 is executed. Specifically, the shape determining unit 22A determines that the first hand candidate 11 is not a light source image.

In Step S140, the position determining unit 22B of the vehicle outside scenery identifying unit 20 determines whether the second hand candidate 12 closer to the steering wheel 2 of the vehicle than the first hand candidate 11 has been detected. In FIG. 14, the position determining unit 22B detects the second hand candidate 12, and the second hand candidate 12 is closer to the steering wheel 2 of the vehicle than the first hand candidate 11. Thus, Step S150 is executed. Specifically, even in the case where the shape determining unit 22A determines that the first hand candidate 11 is not a light source image in Step S130, when the second hand candidate 12 is closer to the steering wheel 2 than the first hand candidate 11, the position determining unit 22B determines that the first hand candidate 11 is not a true hand. Since the position determining unit 22B does not detect the second hand candidate 12 in FIG. 15, Step S160 is executed. Specifically, the position determining unit 22B determines the first hand candidate 11 to be a true hand.

In Step S150, the false recognition identifying unit 30 rejects the first hand candidate 11 that is not a true hand. Here, the false recognition identifying unit 30 rejects not only the first hand candidate 11 that is a light source image in FIG. 13 but also the first hand candidate 11 in FIG. 14.

In Step S160, the false recognition identifying unit 30 outputs the first hand candidate 11 that is a true hand as a result of the identified hand of the occupant. Here, the false recognition identifying unit 30 outputs the first hand candidate 11 in FIG. 15 as a result of the identified hand.

The gesture recognition apparatus 102 described above accurately identifies a hand that is an identification object. The gesture recognition apparatus 102 particularly increases the accuracy of recognition of a gesture of a driver among occupants.

Embodiment 4

A gesture recognition apparatus and a method for recognizing a gesture according to Embodiment 4 will be described. Embodiment 4 will describe a more limitative concept than that of Embodiment 1. In Embodiment 4, the same reference numerals will be assigned to the constituent elements identical to those in one of Embodiments 1 to 3, and the detailed description thereof will be omitted.

The hand candidate identifying unit 10 identifies a hand candidate for each frame of a picture.

The vehicle outside scenery identifying unit 20 determines whether the hand candidate is a light source image, for each of the frames.

When the vehicle outside scenery identifying unit 20 determines that a hand candidate in one frame is not a light source image and when the hand candidate identifying unit 10 does not identify hand candidates with the same shape in N consecutive frames, the false recognition identifying unit 30 rejects the hand candidate determined not to be a light source image. For example, when the false recognition identifying unit 30 determines a hand candidate in one frame to be a true hand and when the hand candidate identifying unit does not identify hand candidates with the same shape in N consecutive frames, the false recognition identifying unit 30 rejects the hand candidate. N is a predefined integer greater than or equal to 2.

The processing circuit illustrated in FIG. 2 or FIG. 3 implements the functions of the hand candidate identifying unit 10, the vehicle outside scenery identifying unit 20, and the false recognition identifying unit 30.

The gesture recognition apparatus described above further increases the accuracy of determining whether a hand candidate is a light source image.

Embodiment 5

A gesture recognition apparatus and a method for recognizing a gesture according to Embodiment 5 will be described. Embodiment 5 will describe a more limitative concept than that of Embodiment 1. In Embodiment 5, the same reference numerals will be assigned to the constituent elements identical to those in one of Embodiments 1 to 4, and the detailed description thereof will be omitted.

The hand candidate identifying unit 10 identifies a hand candidate for each frame of a picture.

The vehicle outside scenery identifying unit 20 determines whether the hand candidate is a light source image, for each of the frames.

When the vehicle outside scenery identifying unit 20 determines a hand candidate to be a light source image in M consecutive frames, the false recognition identifying unit 30 rejects the hand candidate. M is a predefined integer greater than or equal to 2. The processing circuit illustrated in FIG. 2 or FIG. 3 implements the functions of the hand candidate identifying unit 10, the vehicle outside scenery identifying unit 20, and the false recognition identifying unit 30.

The gesture recognition apparatus described above further increases the accuracy of determining whether a hand candidate is a light source image.

Embodiment 6

The gesture recognition apparatus described in each of Embodiments is applicable to a system to be built by appropriately combining a navigation device, a communication terminal, a server, and functions of applications to be installed in these. Examples of the navigation device herein include a portable navigation device (PND). Examples of the communication terminal include mobile terminals such as a mobile phone, a smartphone, and a tablet.

FIG. 16 is a functional block diagram illustrating a configuration of a gesture recognition apparatus 100 according to Embodiment 6 and apparatuses that operate in association with the gesture recognition apparatus 100.

The gesture recognition apparatus 100 and a communication apparatus 130 are installed in a server 300. The gesture recognition apparatus 100 obtains a picture in a cabin of a vehicle 1 from the imager 110 in the vehicle 1 through a communication apparatus 140 and the communication apparatus 130. The gesture recognition apparatus 100 identifies a hand candidate based on the picture. The gesture recognition apparatus 100 determines whether the hand candidate is a light source image, based on a predefined condition on a shape of the hand candidate. The gesture recognition apparatus 100 identifies a hand candidate determined not to be a light source image, as a hand of an occupant with a gesture. The gesture recognition apparatus 100 detects the gesture indicated by the hand of the occupant based on the result of the identification. The gesture recognition apparatus 100 outputs a control signal based on the gesture, to the on-vehicle apparatus 120 through the communication apparatuses 130 and 140. The on-vehicle apparatus 120 is controlled based on the control signal.

As such, disposing the gesture recognition apparatus 100 in the server 300 simplifies the configuration of the apparatuses installed in the vehicle 1.

Furthermore, the functions or the constituent elements of the gesture recognition apparatus 100 may be allocated in a distributed manner, for example, a part of the functions or the constituent elements may be allocated to the server 300 and another part thereof may be allocated to the vehicle 1.

Embodiments according to the present disclosure can be freely combined, or appropriately modified and omitted.

EXPLANATION OF REFERENCE SIGNS

1 vehicle, 2 steering wheel, 3 rear window, 5A pattern, 5B pattern, 10 hand candidate identifying unit, 11 first hand candidate, 12 second hand candidate, 20 vehicle outside scenery identifying unit, 21A shape determining unit, 21B detection determining unit, 22A shape determining unit, 22B position determining unit, 30 false recognition identifying unit, 40 picture obtaining unit, 90 processing circuit, 91 processor, 92 memory, 100 gesture recognition apparatus, 101 gesture recognition apparatus, 102 gesture recognition apparatus, 110 imager, 120 on-vehicle apparatus, 130 communication apparatus, 140 communication apparatus, 300 server, A first region, B second region, C region.

The invention claimed is:

1. A gesture recognition apparatus, comprising:
hand candidate identifying circuitry to identify, based on a picture in a cabin of a vehicle, at least one hand candidate that is a candidate for a hand of an occupant of the vehicle in the picture;
vehicle outside scenery identifying circuitry to determine whether the at least one hand candidate is a light source image ascribable to a light source outside the vehicle, based on a predefined condition on a shape of the hand candidate; and
false recognition identifying circuitry to identify a hand candidate determined not to be the light source image, as the hand of the occupant with a gesture,
wherein the false recognition identifying circuitry rejects a hand candidate determined to be the light source image,
the hand candidate identifying circuitry identifies, as the at least one hand candidate, a first hand candidate in a predefined first region in the picture and a second hand candidate in a predefined second region in the picture,
the vehicle outside scenery identifying circuitry includes:
a shape determining circuitry to determine whether the first hand candidate is the light source image, based on the predefined condition on the shape of the hand candidate; and
a detection determining circuitry to determine whether the second hand candidate has been detected in the predefined second region, and
the false recognition identifying circuitry rejects the first hand candidate determined to be the light source image, based on a result of the determination made by the shape determining circuitry and a result of the determination made by the detection determining circuitry.
2. The gesture recognition apparatus according to claim 1, wherein the predefined condition on the shape of the hand candidate is whether the shape of the hand candidate has one round pattern, or whether the shape of the hand candidate has the one round pattern and a radial pattern around the round pattern.

3. The gesture recognition apparatus according to claim 1, wherein the predefined first region includes a region between a driver's seat and a front passenger seat of the vehicle in the picture, and the predefined second region includes at least a part of a steering wheel of the vehicle in the picture, and a region within a predefined distance from the steering wheel.

4. The gesture recognition apparatus according to claim 1, wherein the predefined first region is a region corresponding to a window of the vehicle in the picture, and the predefined second region includes at least a part of a steering wheel of the vehicle in the picture, and a region within a predefined distance from the steering wheel.

5. The gesture recognition apparatus according to claim 1, wherein the hand candidate identifying circuitry identifies the hand candidate for each frame of the picture, and when the hand candidate is determined not to be the light source image and when hand candidates with a same shape in N consecutive frames are not identified, the false recognition identifying circuitry rejects the hand candidate determined not to be the light source image, where N is a predefined integer greater than or equal to 2.

6. The gesture recognition apparatus according to claim 1, wherein the vehicle outside scenery identifying circuitry determines whether the hand candidate is the light source image, for each frame of the picture, and the false recognition identifying circuitry rejects the hand candidate when the hand candidate is determined to be the light source image in M consecutive frames, where M is a predefined integer greater than or equal to 2.

7. A method for recognizing a gesture, the method comprising:

identifying, based on a picture in a cabin of a vehicle as at least one hand candidate that is a candidate for a hand of an occupant of the vehicle in the picture, a first hand candidate in a predefined first region in the picture and a second hand candidate in a predefined second region in the picture;

determining whether the at least one hand candidate is a light source image ascribable to a light source outside the vehicle, based on a predefined condition on a shape of the hand candidate, the determining including making a first determination whether the first hand candidate is the light source image, and making a second determination whether the second hand candidate has been detected in the predefined second region; and rejecting the first hand candidate determined to be the light source image, based on a result of the first determination and a result of the second determination, and identifying a hand candidate determined not to be the light source image, as the hand of the occupant with a gesture.

\* \* \* \* \*